United States Patent [19]

Bell, III

[11] 4,387,563
[45] Jun. 14, 1983

[54] ARTICULATED POWER TURBINE GATE

[75] Inventor: Albert H. Bell, III, Birmingham, Mich.

[73] Assignee: General Motors Corporation, Detroit, Mich.

[21] Appl. No.: 161,744

[22] Filed: Jun. 23, 1980

Related U.S. Application Data

[63] Continuation-in-part of Ser. No. 50,411, Jun. 20, 1979.

[51] Int. Cl.³ .............................................. F02C 3/10
[52] U.S. Cl. .................................... 60/39.25; 415/151
[58] Field of Search ............... 60/39.25; 415/148, 151, 415/157, 159

[56] References Cited

U.S. PATENT DOCUMENTS

| | | | |
|---|---|---|---|
| 2,565,178 | 8/1951 | Imbert | 60/39.25 |
| 2,889,117 | 6/1959 | Wimpress | 60/39.25 |
| 3,025,668 | 3/1962 | Mock | 60/39.28 |
| 3,124,931 | 3/1964 | Mock | 60/39.28 |
| 3,779,666 | 12/1973 | Snell | 415/151 |

Primary Examiner—Robert E. Garrett
Attorney, Agent, or Firm—J. C. Evans

[57] ABSTRACT

A gas turbine engine has a compressor and power turbine driven by gas flow across a nozzle arrangement that includes a partial admission gate valve therein movable into and out of overlying relationship with a limited number of vanes of the nozzle in order to control power output therefrom during part load operation of the engine. Each gate has a flat downstream face. The gates are moved between stored and blocking positions. Each gate face is engageable with flat valve seat surfaces on nozzle vanes when in the blocking position whereby motive gas pressure will hold the gates sealed against the seats. The gates are operated by quick response pneumatic operators having a regulated source of pressure applied to the operators to move the gates to their blocking positions during a low power road load mode of engine operation; and wherein means are included to produce a quick opening of the gate valve from its partial blocking position to a full open position during a time period that prevents turbine compressor surge as the gas turbine engine responds to a higher power demand wherein greater gas flows through the nozzle for increasing power output from the power turbine of the engine.

8 Claims, 8 Drawing Figures

ARTICULATED POWER TURBINE GATE

This is a continuation-in-part application of U.S. Ser. No. 050,411, filed June 20, 1979, to Albert H. Bell, III, for "Gas Turbine Nozzle Gate Valve."

This invention relates to gas turbine engine control systems and more particularly to gas turbine engine control systems utilizing gates for regulating gas flow through a power turbine nozzle to regulate the power turbine output from a gas turbine engine.

Various proposals have been suggested for controlling the amount of motive fluid directed across the nozzle of a power turbine of a gas turbine engine. One such arrangement is shown in U.S. Pat. No. 3,025,668 issued Mar. 20, 1962, to Mock. The system includes an adjustable damper plate that is arranged in overlying relationship to a diaphragm guide member and rotated with respect to spaced, arcuate sets of turbine nozzle vanes therein for controlling the amount of motive fluid directed into the turbine wheel for controlling the amount of power output therefrom.

U.S. Pat. No. 2,565,178, issued Aug. 21, 1951, to Imbert, discloses another suggestion for blocking part of the gas flow through the turbine nozzle of a gas turbine engine. In this arrangement, a cylinder is moved selectively into and out of the flow passages between the vanes of the turbine expansion nozzle leading to the turbine wheel of the gas turbine engine. The movable flow regulating components of the aforesaid patents are connected to linkages which require a substantial time period for actuation.

In present day automotive gas turbine type engines it is desirable to incorporate lightweight gate valve components of low inertia in association with specially formed turbine nozzle arrangements to effect a controlled, regulation of gas flow through the power turbine to tailor the output power from the engine in a manner to improve specific fuel consumption under part load conditions of operation.

Accordingly, an object of the present invention is to improve high performance, lightweight gas turbine engines by the provision of a quick response controller with gates of low inertia for use with a 360° nozzle ring of a power turbine of an automotive gas turbine engine wherein the gates are selectively positioned at upstream edges of a limited number of the nozzle vanes and selectively moved in a plane arranged perpendicularly to that of the axis of rotation of the power turbine from a stored position out of the hot gas flow path through the turbine and in a way to prevent excessive gas leakage from the gas flow path and movable into the gas flow path to assume a blocking position with respect to the leading edge where a portion of the gate valve is pressure biased against flat portions of the leading edge of a limited number of the nozzle vanes to block flow therethrough in a controlled fashion to increase the turbine inlet temperature for improved thermodynamic operation of the engine.

Another object of the present invention is to provide controllers as set forth in the preceding object wherein the gates are flat discs with side edges selectively positioned against flat surfaced valve seats on the end of airfoil configured nozzle vanes and reciprocable by a slender, sealed stem from a stored position in a disc sealed cavity which prevents gas bypass of the power turbine spool to a position within the gas flow path whereby gas pressure in the flow path biases the side edges of the gate into sealed, seated engagement with the flat surfaced valve seats.

Still another object of the present invention is to improve high performance, lightweight gas turbine engines by the provision of a quick response controller with first and second gates of low inertia for use with a 360° nozzle ring of a power turbine in a gas turbine engine wherein the gates are selectively positioned at upstream, leading edges of first and second sets of the nozzle vanes located in spaced quadrants of the 360° nozzle ring; the first and second gates being movable in a plane arranged generally perpendicularly to that of the axis of rotation of the power turbine from a stored position out of the hot gas flow path through the turbine so as to prevent excessive gas leakage from the gas flow path and also being movable into the gas flow path to assume a flow blocking position wherein portions of the gate valves are pressure biased against valve seat portions on the leading edge of a limited number of the nozzle vanes to block flow therethrough in a controlled fashion to increase the turbine inlet temperature for improved thermodynamic operation of the engine.

Still another object of the present invention is to provide a variable area gas turbine engine controller for regulating flow of motive fluid from an outlet transition of an air and fuel burning combustor under part load conditions of operation wherein a nozzle has an annular row of turbine nozzle vanes therein defining flow passages; each of said vanes including a leading edge and a trailing edge joined by suction and pressure surfaces formed thereon and joining said leading and trailing edges thereof and wherein valve seat surfaces are formed on the leading edge of at least two of said vanes in each of the opposite quadrants of the annular row. The controller further includes first and second gate valves each having an upstream surface thereon faced toward the outlet transition and further including a downstream surface thereon slidably engageable with said valve seat surfaces and means including a pair of elongated control rods locating the gate valves inboard of the annular row of vanes out of flow blockage relationship with exhaust flow from the outlet transition through a full 360° extent of the annular row of vanes thereby to permit unrestricted flow of motive fluid through the nozzle during a full power mode of engine operation. Operators are arranged to move each of the control rods and gate valves in opposite directions into flow blocking alignment with valve seat surfaces in one or the other of the quadrants and means pivotally connect each of the rods to one of the gate valves to permit universally articulated movement therebetween whereby pressurized gas from said outlet transition holds the downstream surface of said gate valve in sealed engagement with the valve seat surfaces.

Yet another object of the present invention is to provide controllers as set forth in any one of the preceding objects wherein the gates have an upstream embossment with an opening therein loosely receiving a portion of a slender, operating rod and further including a clip seated on said gate to capture the rod to carry the gate with the rod as it is positioned within the gas flow path and wherein the clip shifts with respect to the gate to form an articulated joint that allows universal pivotal movement between the gate and rod whereby gas pressure in the flow path will tilt the gate to bias the side edges of the gate into sealed, seated engagement with the valve seat portions.

Further objects and advantages of the present invention will be apparent from the following description, references being had to the accompanying drawings wherein a preferred embodiment of the present invention is clearly shown.

Figures 1, 2, 3:
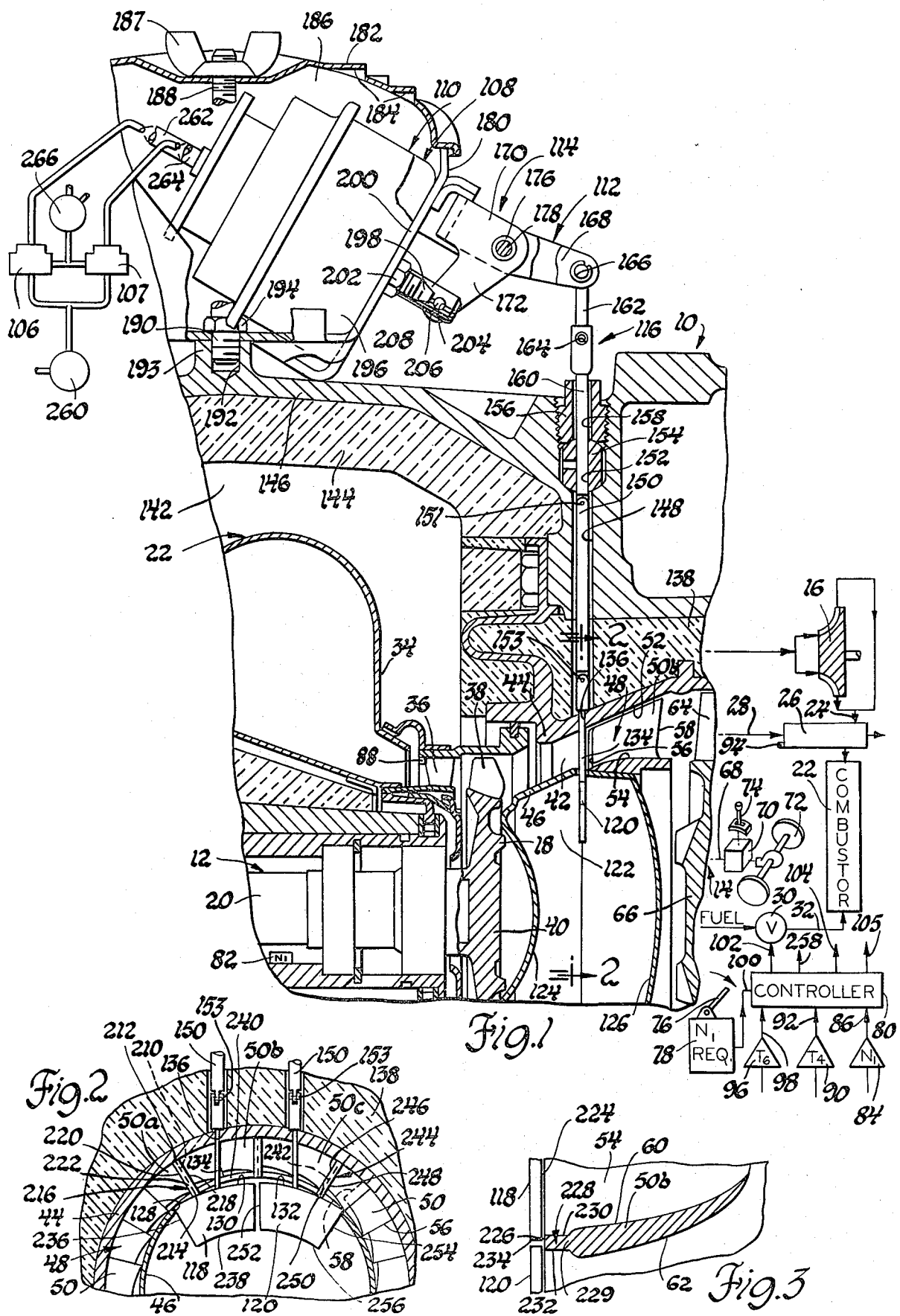
FIG. 1 is a fragmentary longitudinal view of a gas turbine gas flow path associated with a diagrammatic engine system and a quick response pneumatic operator system of the present invention.
FIG. 2 is a fragmentary vertical sectional view taken along the line 2—2 of FIG. 1 looking in the direction of the arrows.
FIG. 3 is a cross-sectional view taken along line 3—3 in FIG. 2 looking in the direction of the arrows.

Referring now to the drawings, in FIG. 1, an automotive gas turbine engine 10 is illustrated having a gas coupled gasifier spool 12 and power turbine spool 14. The gasifier spool 12 includes a compressor 16 that is connected to a high pressure gasifier turbine wheel 18 by a drive shaft 20 so that the compressor 16 is driven to take in atmospheric air, compress it and supply it to a combustor 22 through an inlet air pass 24 of a heat exchanger 26 that further includes an exhaust heat pass 28 therethrough for extracting heat from engine exhaust for preheating of the compressed inlet air directed through the air pass 24 of heat exchanger 26. Fuel is supplied to the combustor 22 from a suitable source such as an engine driven pump (not illustrated) through a fuel controlling or fuel metering valve 30 and an engine fuel supply line 32. Combustion products resulting from burning of the fuel and the air within the combustor 22 are directed through an outlet transition 34 from the combustor 22 thence through an annular row of nozzle vanes 36 against turbine blades 38 on a rotor rim 40 of the high pressure turbine wheel 18 to extract energy for rotation of the compressor 16. The motive fluid from the outlet transition 34 of the combustor 22 is further directed through a gas flow path 42 formed by an annular internal shroud 44 of the engine and an internally located wall 46. The flow path 42 communicates with a power turbine nozzle 48 having an annular row of turbine vanes 50 therein between the inner surface 52 of the shroud 44 and an inner annular band 54 of the power turbine nozzle 48 as best seen in FIG. 2. Each of the turbine vanes 50 includes a leading edge 56 and a trailing edge 58 as well as a suction surface 60 and a pressure surface 62 for directing motive fluid against turbine blades 64 on a rotor wheel 66 of the power turbine spool 14 to extract power from motive fluid directed thereagainst from the power turbine nozzle 48 and thereby to transfer power to an output shaft 68 connected to a suitable transmission 70 and road drive wheels 72. Details of the transmission and drive wheels are omitted herewith for purposes of clarification; however, such details are well known devices used in conjunction with automotive type gas turbine engines. For example, the transmission 70 typically includes some form of clutch or other device which allows the output shaft 68 to rotate when the drive wheels 72 are stationary. Examples of such arrangements are releasable clutch, slipping clutch, a fluid flywheel or most likely a torque converter since such converters produce best operating characteristics in such vehicles. The transmission 70 may also, as is usual, include forward drive gears of several ratios and a reverse drive gear. Such transmissions also include a neutral position in which no power is transmitted to the road drive wheels 72 and furthermore preferably include a park position in which the propeller shaft of the drive is locked. Such transmissions typically include an operating lever 74 movable to select park, reverse, neutral and other forward drive conditions of the transmission.

In the illustrated arrangement, the power level of the engine is controlled by the vehicle operator by a suitable power request input 76 which is usually a foot throttle or actuator pedal of the vehicle. Ordinarily, in gas turbine controls, such as input 76 sets the speed or temperature level of the engine subject to limiting overrides of the power level as preset by the input 76. In the illustrated arrangement, the power request pedal 76 actuates an $N_1$ request transmitter 78 which transmits a signal of desired gas generator speed to a gas turbine engine controller 80. Furthermore, the controller 80 is associated with transducers or transmitters which provide signals indicative of various conditions of engine operation. Only those signals which are necessary for understanding the operation of the improved quick response pneumatic operator of the present invention will be disclosed herein. They include a gas generator turbine speed signal produced by an $N_1$ transducer 82 which may be a suitable electronic or other tachometer having an amplifier 84 to deliver a potential proportional to gas generator speed to a line 86 serving as an input of this signal to the controller 80. Gas generator turbine inlet temperature identified as $T_4$ is measured by a thermocouple of other suitable temperature sensitive means 88 located in the flow path from the combustion apparatus 22 into the high pressure turbine 18. Such temperature measuring devices ordinarily include an amplifier 90 that can include compensation for thermocouple temperature lag to establish an instantaneously corrected turbine inlet temperature directed through the line 92 as an indication of turbine inlet temperature to the controller 80. A third input to the controller 80 is the temperature of the inlet portion of the exhaust path 28 as sensed by a temperature sensing device such as a thermocouple 94 that produces a temperature signal that is compensated for by thermocouple lag in a $T_6$ amplifier 96 connected by an input line 98 to the controller 80 for overriding the power request signal transmitted by the request transmitter 78 through line 100 to the controller 80.

The signal of line 100 is compared to the actual signal from the $N_1$ speed amplifier 84 to produce an error signal that is processed by controller 80 to produce an output signal therefrom through line 102 for controlling the amount of fuel flow through the fuel metering valve 30 to the combustor 22. Additionally, the controller 80 produces signals through lines 104, 105 that are directed to three-way control valve assemblies 106, 107 to actuate them into selective mode positions for establishing the controlling action of quick response pneumatic operators 108, 110, all shown diagrammatically in FIG. 3. The pneumatic operators 108, 110 are coupled through linkages 112, 114 of a drive system 116 to operate a pair of flow control gate valves 118, 120 for regulating the gas flow through the power turbine nozzle 48 as will be discussed.

Referring now more particularly to the flow control gate valves 118, 120, as best shown in FIG. 2, they are located within a storage space 122 within the engine when in a retracted position. More particularly, the storage space 122 is defined by the inner wall 46 and axially spaced metal diaphragms 124, 126. The wall 46 includes an elongated slot 128 therein aligned with upwardly facing curved surfaces 130, 132 formed on the gate valves 118, 120, respectively, to fill the slot 128 when the gates are in a retracted position. The diaphragm 126 is sealed to band 54 to prevent any bypass flow of turbine spool 14 during operation of the gates 118, 120 into flow control positions. Each of the gates 118, 120 has an upstanding stem 134 connected thereto of round cross section. Each stem 134 fits closely in a circular hole 136 in the shroud 44 and a layer 138 of thermal insulation surrounding the shroud 44 to prevent gas bypass of turbine spool 14. The shroud 44 is covered by a second thermal insulation layer 140 inboard thereof in facing relationship to the combustor 22 which is located within an air supply plenum 142 formed in part by an upper layer of thermal insulation 144 covering an engine block wall 146. The engine block wall 146 has a bore 148 therein that loosely receives an operator rod 150 with articulation joints 151, 153 therein. Rod 150 extends through a hole 152 in a seal gland 154 at the upper end of bore 148. Gland 154 is held in place by a plug 156 threadably secured in wall 146. A bore 158 in plug 156 receives the upper end portion 160 of the operator rod 150 which extends outside the wall 146 as best shown in FIG. 1. The upper end 160 of each of the rods 150 is connected by a U-shaped link 162 having one end thereof directed through a pivot hole 164 in the end 160.

Each link 162 has the opposite end thereof directed through a pivot hole 166 in a side segment 168 of a U-shaped lever arm 170 with an opposite side segment 172 thereon. Each of the side segments 168, 172 has a bushing 174 directed therethrough, respectively, with the bushing 174 being freely slidably supported on the outer surface of a cross shaft 178 of the drive system 116 as is best shown in FIG. 1. This arrangement enables the pneumatic operators 108, 110 to be located in close side-by-side relationship within a sheet metal housing 180 having a removable sheet metal cover 182 with louvers 184 struck in one end thereof to cool the interior 186 formed between the cover 182 and the housing 180. The housing and cover are held in place by a wing nut 187 and upright threaded stud 188 having a lower threaded end 190 threadably received in a tapped bore 192 in a boss 193 on engine block wall 146 as best shown in FIG. 1. Lock nut 194 fixes end 190 in place.

Each of the quick response pneumatic operators 108, 110 includes a cylindrical support base 196 with connector studs 198 thereon that extend through openings in the housing 180 at a wall segment 200 thereof where they are fastened in place by nuts 202.

As best shown in FIG. 1, each of the lever side segments 172 is in the form of a crank arm with a pivot point 204 thereon secured by a pin 206 to the outboard end of a reciprocal shaft 208 of each of the operators 108, 110. Each shaft 208 is reciprocated to pull or push the rods 150 to adjust the control positions of gate valves 118, 120. Suitable operators 108, 110 to accomplish this purpose are set forth in copending U.S. Ser. No. 050,150, to Hitzelberger, filed June 20, 1979, for QUICK RELEASE TURBINE GATE VALVE; and U.S. Ser. No. 050,152, to Flatt filed June 20, 1979, for DUMP CONTROL FOR TURBINE ENGINE GATE VALVE ACTUATOR; both applications having an assignee common to the present application.

The gate valves 118, 120, when in their stored position, are located below three spaced nozzle vanes 50a, 50b and 50c as best shown in FIG. 2. The nozzle vane 50a, as best shown in FIGS. 1 and 2, has a leading edge 210 thereon that extends radially from a tip located point 212 thereon located radially inwardly of the outer shroud surface 52 to a hub point 214 thereon located inwardly of the point 212 at a point along the inner surface of the inner annular band 54. The vane 50a further includes an integral extension 216 thereon that has a pair of parallel side faces 218, 220 both located upstream of the leading edge 210 and extending upwardly thereof to locate a flat valve seat surface 222 at a point substantially perpendicular to that of the axis of rotation of the engine drive shaft at a point immediately downstream of a downstream face 224 of the gate valve 118. The valve seat surface 222 cooperates with a second flat valve seat surface 226 formed on an extension 228 from the leading edge 229 of turbine vane 50b. The extension 228 includes sides 230, 232 thereon that have an axial extent adjacent the inner band 122 than at the inner surface 52 of the outer shroud of the turbine as best shown in FIGS. 1 and 3. The valve seat surface 226 is located in the same plane as that of the valve seat defined by the surface 222 and cooperates with a side edge 234 of the gate valve 118 located substantially along the center line of the engine block and nozzle as best shown in FIG. 2. The opposite edge 236 of the gate valve 118 cooperates with the valve seat surface 222 so that when the gate valve 118 is pulled upwardly into a blocking position in the flow path 42, the side edges 234, 236 will be held by gas pressure within the flow path in sealed engagement with the flat valve seat surfaces 226, 222, respectively. When the gate valve 118 is in its blocking position, the curved surface 130 thereon will be located in sealed engagement with the surface 52 and an arcuate base edge segment 238 thereon will be aligned and pressed against a sealing margin 240 of the nozzle so as to completely block air flow through nozzle passages between the surfaces 222, 226.

The power turbine nozzle 48 further includes a third vane 50c that includes a leading edge 242 thereon having an extension 244 therefrom with parallel side edges 246, 248 that terminate in a flat valve seat surface 250 defining a valve seat spaced from the flat surface 226 of the intermediate vane 50b. As in the previous cases, the length of the extension 244 extends between the inner band 54 and adjacent the inner surface 52 so as to locate the valve seat surface 250 in a plane corresponding to that of the previously described surfaces 222 and 226. Accordingly, the surfaces 226, 250 serve to sealingly engage side edges 252, 254 on opposite sides of the gate valve 120 so that when it is in a blocking position with respect to the nozzle 48 the edges 252, 254 will be sealingly seated against the surfaces 226, 250 and the curved surface 132 will be located against the inner surface 52 while a base edge 256 of the gate 120 will also seal against a sealing margin 240 of the nozzle 248.

Operation of the controllers 108, 110 in a typical engine operating sequence includes conditioning them to place gate valves 118, 120 as shown in FIG. 2 as the spool 12 increases in speed from an idle speed to 50%-60% of design speed whereby the power turbine nozzle 48 is fully opened through a 360° row of nozzle vanes 50. However, as the gasifier spool speed increases it has been observed that more thermally efficient operation can be obtained by selectively pulling one or both of the gates 118, 120 upwardly into overlying relationship with flat surfaces 222, 226 and 250 on the leading edges of the nozzle vanes 50a, 50b, 50c as shown in FIG. 2. More particularly as the gasifier spool speed increases, a signal from line 104 will direct pressure from a regulated pressure source 260 into the inlet 262 of pneumatic operator 108 to cause an increase in pressure within its chamber which will cause a controlled rightward movement of the shaft 208 as shown in FIG. 1. This will cause the pivot point 204 to move in an arcuate path around the axis of the support shaft 178 and will thereby shift the control rod 150 that is connected to the gate 118 in an upward direction. The curved surface 130 will move across the gas flow passages between the flat surfaces 222, 226 on the leading edges of the vanes 50a, 50c of turbine nozzle 48 to gradually reduce the total flow area through the turbine nozzle by an amount equal to the planar extent of the gate 118. Eventually, the gate 118 is moved to a closed position where the curved edge 130 engages the inner surface 52 of shroud 44. At this point the side 236 is pressed by motive fluid in flow path 42 into engagement with the flat surface 222 and the side 234 is seated in sealed engagement with the flat surface 226. The reduction in total flow area through the nozzle 48 produced by such movement of gate 118 is gradual and there will be a gradual power change that is accompanied by an increase in the inlet temperature of the turbine 18. This causes an increase in thermal efficiency and reduces specific fuel consumption of the engine. As engine speed continues to increase a second signal is directed through the line 105 to the pneumatic operator 110 to direct pressure thereto from a regulated pressure source 260 to the inlet tube 264 of the pneumatic operator 110. This will shift reciprocal shaft 208 thereof outwardly in a direction to cause the rod 150 of gate valve 120 to move outwardly of the engine block wall 146 so that the curved surface 132 of gate valve 120 will move slowly to block the flow area between the flat surfaces 226, 250 on the turbine nozzle 48 until side edges 252, 254 on either side of gate valve 120 are located in sealing engagement with the full vertical extent of the flat surfaces 226, 250. This completely blocks a second limited arcuate extent of the total flow area through the 360° row of turbine vanes 50. The remainder of the inlet passages between the vanes of the turbine nozzle 48 are unaffected by the control movement and a near complete annulus of gas flow (other than through the portion blocked by gates 118, 120) freely flows from the flow path 42 through the nozzle 48 thereby to prevent any substantial change in the aerodynamic flow pattern of the flow path through the engine.

The additional blockage of the nozzle 48 by gate valve 120 will further increase the inlet temperature of high pressure turbine 18 to produce greater thermal efficiency thereby to reduce the specific fuel consumption of the engine.

In such turbine engine operation it is observed that as the $T_4$ temperature increases, the temperature of the regenerator, $T_6$, as sensed by the thermocouple 94, may exceed desired limits. If this condition occurs, the signal in line 105 is modified to condition the pneumatic controller 110 to cause a slow retraction of the operating shaft 208 to the left as shown in FIG. 1. This will cause the gate valve 120 to be pushed downwardly by the control rod 150 connected thereto to gradually increase the amount of gas flow through the power nozzle 48 to produce a gradual power change which will cause the turbine inlet temperature to be reduced. As the turbine engine inlet temperature goes down, the $T_6$ temperature will follow to maintain modulated control of the $T_6$ temperature produced in response to a slow movement of the gate valve 120 into its stored position within the storage space 122. If further thermal regulation is required, a like conditioning of the three-way valve 106 can occur to produce a like operation of the pneumatic controller 108 and gate valve 118.

Thus, between idle and normal road speeds, (50%-60% of $N_1$ engine design speed), both the gate valves 118, 120 are located in the storage position. When the spool 12 reaches approximately 60% of its full design speed, the speed of operation is that reached under normal road load conditions. Accordingly, the gates are operated to slowly increase power by movement into their blocking positions as previously discussed, preferably in a staged fashion, and this will increase the input temperature to the turbine and will result in a more efficient thermal operation with a reduced requirement for fuel. The gates 118, 120 are moved from their blocking position under such road load conditions only in cases where the increases in the temperature of the turbine increase to the point where the downstream temperature $T_6$ of the heat exchanger 26 exceeds an upper limit. At this point the control gates are adjusted between open and closed positions with respect to only a limited arcuate extent of the 360° nozzle 48, again at a slow rate, because of the configuration of the improved pneumatic operators 108, 110 of the present invention and the associated fluid supply system.

Another feature of the present invention is that the quick response pneumatic operators 108, 110 can be quickly conditioned through means of a single fluid connection to produce a quick movement of the gate valves 118, 120 from the gas flow path if desired. One such operating condition is that which occurs when the power request pedal 76 is quickly rotated clockwise as shown in FIG. 1 to impose a large power demand signal through the input line 100 to the controller 80. At this point a large error signal is produced in the governing action of the controller 80 wherein the demand signal through the line 100 is compared with the actual speed $N_1$ of the spool 12 directed to the controller 80 through the line 86. The error signal will produce an output signal on the line 102 for an increase in fuel to the combustor 22. This produces an immediate increase in the mass flow through the nozzle 36 to the gasifier turbine 38 to produce a speed increase in $N_1$ and correction of the previously mentioned error signal. During this phase of operation the improved gate valves 118, 120 are readily responsive to the increased mass flow through the gas flow path 42 of the engine to the nozzle 48 as follows.

As the error signal is produced, an output signal is produced from line 258 of the controller to a dump valve 260 so operators 108, 110 are conditioned to snap the reciprocal shafts 208 to the left as shown in FIG. 1 thereby to produce an immediate movement of the gate valves 118, 120 into their storage position within the space 126.

The advantage of such a quick response mode of operation is especially desirable in gas turbine engines of the aforesaid type. Because of the quick response mode of operation of the pneumatic operators 108, 110 and gate valves 118, 120 of low inertia the nozzle 48 will have its full open area ready to receive increased mass of fluid flow from the gasifier when it accelerates in response to large error signals produced upon a rapid movement of the power request pedal 76 thereby the prevent compressor surge.

In the embodiment of FIGS. 1-3, it will be observed that the gate valves 118, 120 are arranged so that side edges 252, 254 thereon are located in close spaced parallel relationship during operation of the gate valves between flow blockage and stored position. The amount of flow area that can be controlled by the two gates is thus geometrically constrained to an upper arcuate portion of the 360° extent of the annular row of nozzle vanes. Accordingly, in a second embodiment of the invention, as set forth in FIGS. 4-8, an arrangement is provided wherein both sides of the vane can be flared angularly to cover a greater portion of the 360° extent of the annular row of nozzle vanes.

Figure 4:
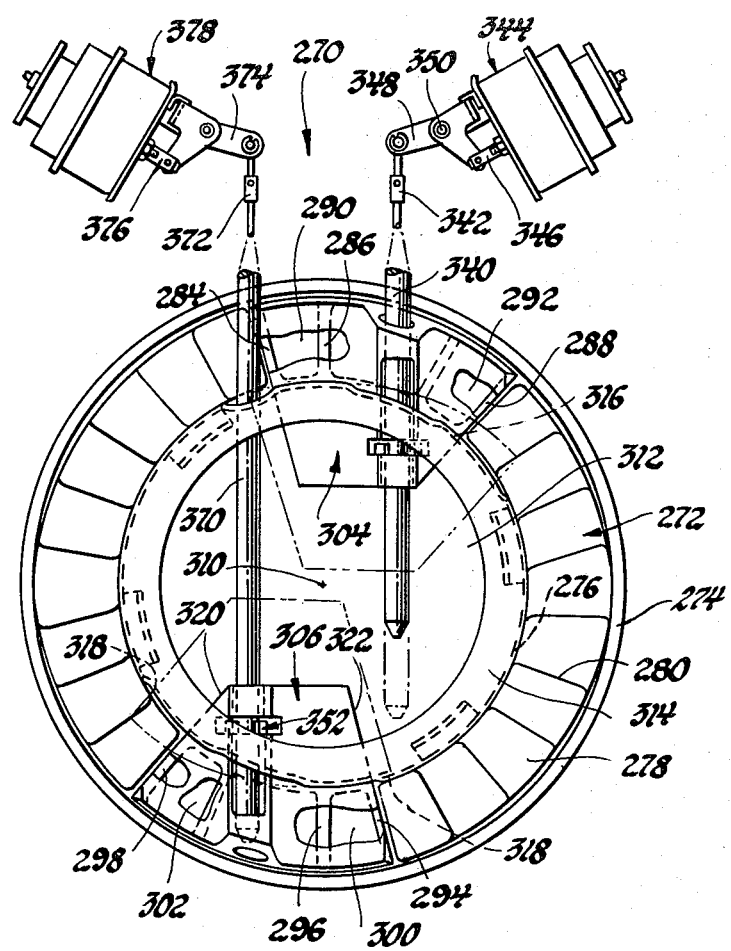
FIG. 4 is a front elevational view of a second embodiment of the present invention having movable gate valves located in opposed quadrants of an annular row of nozzle vanes.

In FIG. 4, the second embodiment is shown as including a turbine nozzle controller 270. It includes an annular row of nozzle vanes 272 extending between an annular outer shroud 274 of the nozzle ring and an inner shroud ring 276 thereof which correspond to like components found in the embodiment of FIGS. 1-3. For the most part, individual ones of the nozzle vanes 278 include conventional leading edges 280 thereon that merge with suction and pressure surfaces of the type set forth in the first embodiment that join at a trailing edge on each of the vanes.

In this embodiment, however, a greater percentage of the flow area through the annular row of nozzle vanes 272 is variably controlled. The increased flow area, in part, is defined by a first plurality of the nozzle vanes 278 in an upper quadrant of the annular row of nozzle vane 272 as viewed in FIG. 4. The vanes 278 have leading edges thereof extended to form valve seats 284, 286 and 288. The valve seats 284, 286 have a first nozzle passage 290 therebetween, and the valve seats 286, 288 include three like nozzle flow passages one of which is shown at 292. Hence, the arrangement bounds four nozzle flow passages.

Likewise, in a diametrically opposite portion of the annular row of nozzle vanes 272 other of the individual vanes 278 have extensions on their leading edge portions. More particularly, vane extensions are formed to define a first flat valve seat 294 formed diametrically opposite the valve seat 284 on the opposite side of the annular row of nozzle vanes 272. Also, a valve seat of like form is formed at 296 on a vane located diametrically opposite to the valve seat 286. And, finally, a flat valve seat 298 is formed on a vane diametrically opposite the valve seat 288.

As in the first set of valve seats formed in the upper quadrant as shown on FIG. 4, the valve seats 294, 296 bound a nozzle flow passage 300 and the valve seats 296, 298 bound three nozzle passages corresponding to nozzle passage 296, one of which is shown in fragmentary form at 302 adjacent the illustrated valve seat 298. Thus, a total of eight nozzle passages are bounded at their extremities by flat valve seat surfaces compared to a total of six nozzle vane passages in the embodiment of FIGS. 2-3.

The expansion of the total flow area controlled by the controller 270 as compared to the embodiment of FIGS. 1-3 is made possible by a uniquely configured pair of gate valves 304, 306 located in a unique fashion to be moved into and out of blocking relationship with the aforedescribed valve seat surfaces. More particularly, each of the gate valves 304, 306 includes a flared geometric form that will establish a greater coverage of a portion of a 360° nozzle ring without interference movement between portions of the operating gate valves. In addition to the geometric form, the greater coverage of flow area is in part due to the location of the gate valves 304, 306 as shown in FIG. 4. More particularly, the gate valve 304 is located in one quadrant of the annular row of nozzle vanes 272 and the other gate valve 306 is located in a diametrically opposite quadrant of the annular row of nozzle vanes 272.

The geometry of each of the gate valves 304, 306 is alike. Gate valve 304 is shown in FIGS. 5-8, it being understood that its description applies to gate 306. An arcuate surface 308 is formed on the radially outermost portion of each of the gates when in an operative position as shown in FIG. 4 and with reference to the center 310 of a storage space 312.

The storage space 312 is formed in part by a sheet metal closure member 314 of annular form. Member 314 includes an upper slot 316 in which the gate valve 304 is located and it also includes a diametrically located slot 318 in which the gate 306 is located. The arcuate extent of both of the slots 316 and 318 are sufficient to accommodate the full arcuate extent of the surface 308 when the gates 304, 306 are moved into their stored positions as shown in dotted lines in FIG. 4.

Additionally, each of the gate valves 304, 306 includes side surfaces 320, 322 that converge toward each other from the arcuate surface 308 and extend to a flat surface 324 that is located radially inwardly within the storage space 312 when the gate valves 304, 306 are located both in a stored position and in a full flow blockage position with respect to the annular row of nozzle vanes 272.

Figure 6:
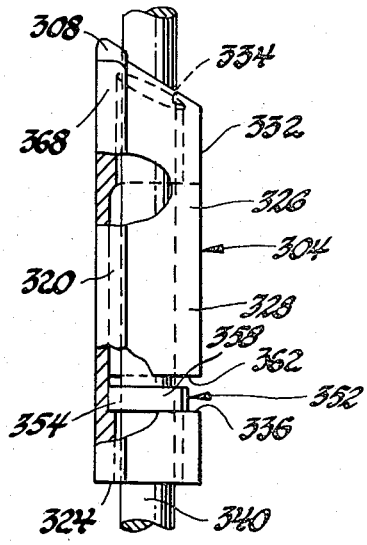
FIG. 6 is a side elevational view taken along the line 6—6 in FIG. 5 looking in the direction of the arrows, partially broken away and shown in cross section.

Each of the gate valves 304, 306 further includes an upstream embossment 326 thereon which includes a pair of side ribs 328 and 330 that join to a guide segment 332 having a circular hole 334 therethrough. Additionally, the embossment 326 has a cross slot 336 formed therethrough at a point slightly radially outwardly of the flat surface 324 on each of the gate valves 304, 306. The depth of the cross slot 336 extends to an upstream gate valve surface 338 which forms the front of a reduced section 339 as best shown in FIG. 6 to minimize the inertia of the gate valves 304, 306 in accordance with the present invention.

Figure 5:
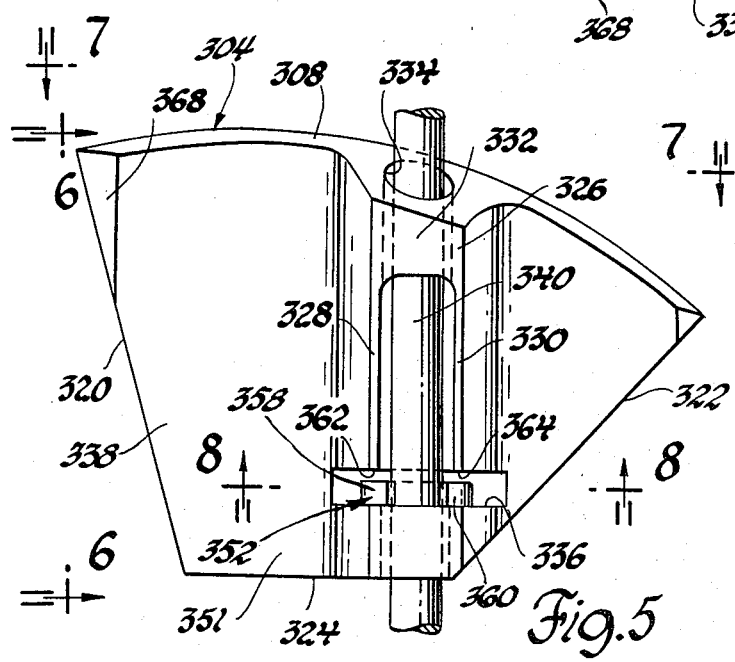
FIG. 5 is an enlarged front elevational view of a gate valve suitable for use in the present invention.

The reduced section 339 extends through most of the planar extent of the gate valves 304, 306 as viewed from the upstream direction as shown in FIGS. 4 and 5, and the thicker portions thereof are limited to the vicinity of the embossment 326.

The embossment 326, as best shown in FIG. 5, forms part of a means to couple the gate valve 304, 306 to gate valve actuating rods of the controller 270.

More particularly, the controller 270 includes a control rod 340 having the upper end thereof pivotally connected by a clip 342 to a pneumatic operator 34 like the operators 108, 110 in the first embodiment. The operator 344 is arranged so that when it is in a position with its actuator shaft 346 located outwardly of the controller 344 the lever arm 348 is pivoted about the shaft 350 to pull the control rod 340 radially outwardly of the annular row of nozzle vanes 272. This will shift the gate valve 304 into a flow blockage position with respect to the annular row of nozzle vanes 272 as shown in solid line position in FIG. 4. At this point, the side portions of the gate valve 304 will overlie the valve seats 284, 288 and a skirt region 351 of the gate valve 304 will overlie an arcuate extent of the inner shroud ring 276 between the valve seat 284 and the valve seat 288. Additionally, the arcuate surface 308 of the gate valves 304 will overlie a portion of an arcuate extent of the upstream end of the outer shroud 274.

When in this position, another feature of the present invention assures that the gate 304 will be articulated for universal movement with respect to the control rod 340 so as to firmly seat against the aforesaid valve seats 284 and 288. More particularly, this is accomplished by means of a clip 352 that captures the rod and loosely connects it to the gate valve 304. The clip 352 more particularly fits in cross slot 336. Clip 352 includes a bight portion 354 that fits in a side groove 356 of the rod 340. The clip 352 is thereby secured to the rod 340 to move therewith. The clip 352 has a height slightly less than that of the cross slot 336 and includes curved side segments 358, 360 that overlie the end surfaces 362, 364 on the ribs 328, 330, respectively.

Figure 7:
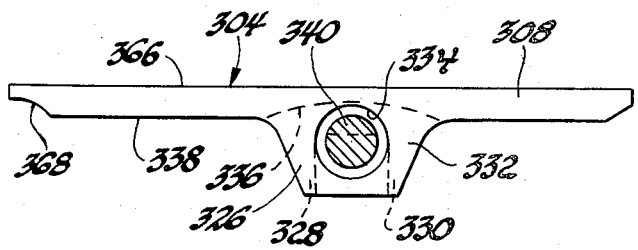
FIG. 7 is a horizontal sectional view taken along the line 7—7 of FIG. 5 looking in the direction of the arrows.
Figure 8:
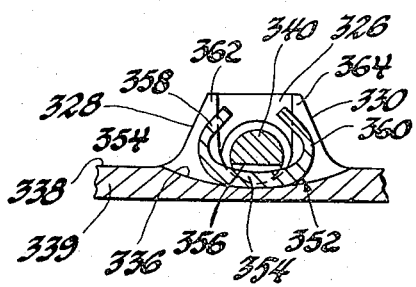
FIG. 8 is a fragmentary horizontal sectional view taken along the line 8—8 of FIG. 5 looking in the direction of the arrows.

Moreover, and as best seen in FIG. 7, the outside diameter of the control rod 340 is of a reduced diameter to that of the circular hole 334 formed through the embossment 326 so that when the control rod 340 is in its closure position as shown in solid line in FIG. 4, the downstream face 366 of the gate valve will have a somewhat universally articulated movement with respect to rod 340 and this can be moved by pressure against the upstream surface 338 thereof to assure good sealing between the gate and the valve seats previously described.

Additionally, in the illustrated arrangement, a scallop 368 is formed on one side of the gate 304 to define sufficient relief for passage of a second control rod 370 that is coupled by a clip 372 to an operator lever 374 connected to an operating shaft 376 of a second pneumatic operator 378 like operator 344. In this arrangement, when the operator 378 is in a retracted position the control rod 370 is moved into the solid position shown in FIG. 4. At this point, the side segments 320, 322 of the gate valve 306 will be located in overlying relationship with the valve seats 298, 294, and the skirt portion 351 thereof will be aligned with a segment of the inner shroud 276 while the arcuate surface 308 on the gate valve 306 will overlap the outer shroud 274. As in the case of the gate valve 304, the control rod 370 is connected to the gate 306 by a clip 352 connected in the same fashion as in the previously described coupling between the control rod 340 and the gate valve 304.

Operation of the gate valves between the solid line and closed positions and dotted line open positions shown in FIG. 4 will be dependent upon a predetermined operating schedule which can take the form of the schedules discussed with respect to the operation of the gate valves in the embodiment of FIGS. 1–3.

Furthermore, while the improved low cost articulated coupling between a control rod and gate valve is shown with respect to the wide angle gate valves 304, 306, the coupling is equally applicable to gate valves of the type shown in FIGS. 1–3 if articulated gate valve movement is desired.

While the embodiments of the present invention, as herein disclosed, constitute a preferred form, it is to be understood that other forms might be adopted.

The embodiments of the invention in which an exclusive property or privilege is claimed are defined as follows:

1. A variable area gas turbine engine controller for regulating flow of motive fluid from an outlet transition of an air and fuel burning combustor under part load conditions of operation comprising a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes, a gate valve having an upstream surface thereon faced toward said outlet transition and further including a downstream surface thereon slidably engageable with said valve seat surfaces, means for storing said gate valve out of flow blockage relationship with exhaust flow through said outlet transition through a full 360° extent of said row of vanes thereby to permit unrestricted flow of motive fluid through said nozzle during a full power mode of engine operation, and means for moving said gate valve into a full blocking alignment with said vane row whereby pressurized gas from said outlet transition holds said downstream surface of said gate valve in sealed engagement with said valve seat surfaces.

2. A variable area gas turbine engine controller for regulating flow of motive fluid from an outlet transition of an air and fuel burning combustor under part load conditions of operation comprising a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes, a gate valve having an upstream surface thereon faced toward said outlet transition and further including a downstream surface thereon slidably engageable with said valve seat surfaces, means for storing said gate valve out of flow blockage relationship with exhaust flow through said outlet transition through a full 360° extent of said row of vanes thereby to permit unrestricted flow of motive fluid through said nozzle during a full power mode of engine operation, and means for moving said gate valve into a full blocking alignment with said vane row whereby pressurized gas from said outlet transition holds said downstream surface of said gate valve in sealed engagement with said valve seat surfaces, said gate valve having an arcuate extent and side surfaces moved into flow blocking alignment with said valve seat surfaces by flow from said outlet transition to bias them into sealing engagement with said valve seat surfaces for limiting flow through at least one of the flow passages in said nozzle during a part load condition of engine operation.

3. A variable area gas turbine engine controller for regulating flow of motive fluid from an outlet transition of an air and fuel burning combustor under part load conditions of operation comprising a nozzle having annular outer and inner shrouds with a 360° row of turbine nozzle vanes therein defining flow passages, each of said vanes including a leading edge and a trailing edge joined by suction and pressure surfaces formed thereon and joining said leading and trailing edges thereof, a rib extension on the leading edge of at least two of said vanes, each of said rib extensions being located axially of said vanes upstream thereof for forming a valve seat surface at the inlet to said nozzle, a gate valve having an upstream surface thereon faced toward said outlet transition and further including a downstream surface thereon slidably engageable with said valve seat surfaces, means for storing said gate valve out of flow blockage relationship with exhaust flow through said outlet transition through a full 360° extent of said row of vanes thereby to permit unrestricted flow of motive fluid through said nozzle during a full power mode of engine operation, and means for moving said gate valve into a full blocking alignment with said vane row whereby pressurized gas from said outlet transition holds said downstream surface of said gate valve in sealed engagement with said valve seat surfaces.

4. A variable area gas turbine engine controller for regulating flow of motive fluid from an outlet transition of an air and fuel burning combustor under part load conditions of operation comprising a nozzle having annular outer and inner shrouds with a 360° row of turbine nozzle vanes therein defining flow passages, each of said vanes including a leading edge and a trailing edge joined by suction and pressure surfaces formed thereon and joining said leading and trailing edges thereof, a rib extension on the leading edge of at least two of said vanes, each of said rib extensions being located axially of said vanes upstream thereof for forming a valve seat surface at the inlet to said nozzle, a gate valve having an upstream surface thereon faced toward said outlet transition and further including a downstream surface thereon slidably engageable with said valve seat surfaces, means for storing said gate valve out of flow blockage relationship with exhaust flow through said outlet transition through a full 360° extent of said row of vanes thereby to permit unrestricted flow of motive fluid through said nozzle during a full power mode of engine operation, and means for moving said gate valve into a full blocking alignment with said vane row whereby pressurized gas from said outlet transition holds said downstream surface of said gate valve in sealed engagement with said valve seat surfaces, said gate valve being trapezoidally shaped and having an arcuate top thereon with side surfaces, said arcuate top conforming to said outer shroud when said side surfaces are moved into flow blocking alignment with said valve seat surfaces to cause flow from said outlet transition to bias said side surfaces into sealing engagement with said valve seat surfaces for limiting flow through at least one of the flow passages in said nozzle during a part load condition of engine operation.

5. A variable area gas turbine engine controller for regulating flow of motive fluid from an outlet transition of an air and fuel burning combustor under part load conditions of operation comprising a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes, a gate valve having an upstream surface thereon faced toward said outlet transition and further including a downstream surface thereon slidably engageable with said valve seat surfaces, means including an internal diaphragm sealed to the turbine nozzle for storing said gate valve out of flow blockage relationship with exhaust flow through said outlet transition through a full 360° extent of said row of vanes thereby to permit unrestricted flow of motive fluid through said nozzle during a full power mode of engine operation without gas bypass of the nozzle, and means including a sealed stem for moving said gate valve into a full blocking alignment with said vane row whereby pressurized gas from said outlet transition holds said downstream surface of said gate valve in sealed engagement with said valve seat surfaces.

6. A variable area gas turbine engine controller for regulating flow of motive fluid from an outlet transition of an air and fuel burning combustor under part load conditions of operation comprising: a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes of said annular row, a gate valve having an upstream surface thereon faced toward said outlet transition and further including a downstream surface thereon slidably engageable with said valve seat surfaces, means including an elongated control rod for locating said gate valve in a stored position with respect to said annular row of vanes out of flow blockage relationship with exhaust flow through said outlet transition through a full 360° extent of said row of vanes thereby to permit unrestricted flow of motive fluid through said nozzle during a full power mode of engine operation, means for moving said control rod and said gate valve into flow blocking alignment with said valve seat surfaces and means pivotally connecting said rod to said gate valve to permit articulated movement therebetween whereby pressurized gas from said outlet transition holds said downstream surface of said gate valve in sealed engagement with said valve seat surfaces.

7. A variable area gas turbine engine controller for regulating flow of motive fluid from an outlet transition of an air and fuel burning combustor under part load conditions of operation comprising: a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes of said annular row, a gate valve having an upstream surface thereon faced toward said outlet transition and further including a downstream surface thereon slidably engageable with said valve seat surfaces, means including an elongated control rod for locating said gate valve in a stored position with respect to said annular row of vanes out of flow blockage relationship with exhaust flow through said outlet transition through a full 360° extent of said row of vanes thereby to permit unrestricted flow of motive fluid through said nozzle during a full power mode of engine operation, means for moving said control rod and said gate valve into flow blocking alignment with valve seat surfaces, said rod leaving a side groove thereon, said gate having an embossment on said upstream surface including a hole for receiving said rod for limited movement of said gate valve with respect to said rod and clip means loosely sealed in said embossment and capturing said rod at the side groove therein for connecting said rod to said gate valve thereby to permit articulated movement therebetween whereby pressurized gas from said outlet transition holds said downstream surface of said gate valve in sealed engagement with said valve seat surfaces.

8. A variable area gas turbine engine controller for regulating flow of motive fluid from an outlet transition of an air and fuel burning combustor under part load conditions of operation comprising: a nozzle having an annular row of turbine nozzle vanes therein defining flow passages, each of said vanes including a leading edge and a trailing edge joined by suction and pressure surfaces formed thereon and joining said leading and trailing edges thereof, means forming valve seat surfaces on the leading edge of at least two of said vanes in each of opposite quadrants of said annular row, first and second gate valves each having an upstream surface thereon faced toward said outlet transition and further including a downstream surface thereon slidably engageable with said valve seat surfaces, means including a pair of elongated control rods for locating said gate valves inboard of said annular row of vanes out of flow blockage relationship with exhaust flow through said outlet transition through a full 360° extent of said row of vanes thereby to permit unrestricted flow of motive fluid through said nozzle during a full power mode of engine operation, means for moving each of said control rods and each of said gate valves in opposite directions into flow blocking alignment with valve seat surfaces in one or the other of said quadrants and means pivotally connecting each of said rods to one of said gate valves to permit articulated movement therebetween whereby pressurized gas from said outlet transition holds said downstream surface of each of said one of said gate valves in sealed engagement with said valve seat surfaces.

* * * * *